(12) United States Patent
Van Der Wiel

(10) Patent No.: US 8,302,471 B2
(45) Date of Patent: Nov. 6, 2012

(54) CALORIMETRIC FLOW METER HAVING HIGH HEAT CONDUCTIVITY STRIPS

(75) Inventor: Appolonius Jacobus Van Der Wiel, Tervuren (BE)

(73) Assignee: Melexis NV, Ieper (BE)

( * ) Notice: Subject to any disclaimer, the term of this patent is extended or adjusted under 35 U.S.C. 154(b) by 561 days.

(21) Appl. No.: 12/095,717

(22) PCT Filed: Dec. 1, 2006

(86) PCT No.: PCT/IB2006/003443
§ 371 (c)(1),
(2), (4) Date: Jan. 19, 2010

(87) PCT Pub. No.: WO2007/063407
PCT Pub. Date: Jun. 7, 2007

(65) Prior Publication Data
US 2010/0107755 A1    May 6, 2010

(30) Foreign Application Priority Data

Dec. 2, 2005 (GB) .................................. 0524636.8
Dec. 19, 2005 (GB) .................................. 0525759.7

(51) Int. Cl.
*G01F 1/68*    (2006.01)
(52) U.S. Cl. ..................... 73/204.11; 73/204.26; 374/31
(58) Field of Classification Search ........................ None
See application file for complete search history.

(56) References Cited

U.S. PATENT DOCUMENTS

| | | | |
|---|---|---|---|
| 4,320,655 A | 3/1982 | Kammermaier et al. | |
| 4,464,932 A | 8/1984 | Ewing et al. | |
| 4,542,650 A | 9/1985 | Renken et al. | |
| 4,972,707 A * | 11/1990 | Nijdam | 73/204.12 |
| 6,331,074 B1 * | 12/2001 | Kimura | 374/10 |
| 6,395,585 B2 | 5/2002 | Brandl | |
| 7,691,652 B2 * | 4/2010 | Van Der Wiel | 438/25 |
| 2003/0041664 A1 * | 3/2003 | Ariyoshi | 73/204.26 |
| 2004/0168513 A1 | 9/2004 | Aoshima et al. | |

FOREIGN PATENT DOCUMENTS

| | | |
|---|---|---|
| DE | 195 11 687 A1 | 10/1996 |
| EP | 0 813 236 A1 | 12/1997 |

OTHER PUBLICATIONS

International Search Report issued on Jul. 17, 2007 for PCT/IB/2006/003443, with an International Filing Date of Jan. 12, 2006. (PCT Counterpart of this application).

* cited by examiner

*Primary Examiner* — Harshad R Patel
(74) *Attorney, Agent, or Firm* — Leydig, Voit & Mayer, LLP

(57) ABSTRACT

A flow meter includes a heater for heating a fluid flow along a membrane. A temperature difference is measured between and upstream point and a downstream point. There are additionally provided one or more strips of material having a relatively high heat conductivity. Strips that are substantially perpendicular to the flow direction direct heat from the heater to the sides of the membrane, causing a large proportion of the heat that would otherwise drive heat flows to be dispersed and decreases inaccuracies or bias in the measured flow rate. Strips of material that are provided parallel to the flow direction act to direct heat from the heater along the direction of flow. This increases the proportion of heat that flows along this axis and guides the flow and hence reduces the proportion of heat available to drive heat flows that cause inaccuracies and bias in the measured flow rates.

20 Claims, 3 Drawing Sheets

CALORIMETRIC FLOW METER HAVING HIGH HEAT CONDUCTIVITY STRIPS

The present invention relates to calorimetric flow meters and in particular calorimetric flow meters implemented as integrated circuits.

Calorimetric flow meters measure mass flow and are used in industry and in the medical profession to measure the flow of a fluid. The fluid flows along a particular path defined by a suitable article and a heater is provided located halfway along the path for heating the middle of the pad, and the rest of the path being unheated. The fluid is heated by the path. Sometimes several heaters are provided along the path. Examples of articles that may be suitable for defining a path include tubes and membranes.

When the heater is on and no fluid flows the heater causes a temperature distribution along the path whereby the temperature drops with distance from the heater. When a fluid flow is present in the tube, heat exchange takes place between the article defining the path and the fluid. Upstream from the heater fluid flow will cool the path defining article slightly from the expected temperature distribution and downstream the fluid flow will cool the path defining article slightly less or even heat the path defining article slightly relative to the zero flow temperature distribution. Temperature sensors positioned between the heater and the ends of the path defining article are operative to detect the difference $\Delta T$ between the measured upstream and downstream temperatures.

The temperature difference $\Delta T$ between upstream and downstream is proportional to the mass flow rate $\phi_m$. Accordingly, this can be used to calculate the mass flow rate. The relation between the temperature difference $\Delta T$ and mass flow rate $\phi_m$ is also dependant on the heat conductivity of the path defining article and the properties of the fluid such as pressure, humidity, viscosity and heat conductivity.

Typically, the temperature sensors and the heater are thermally isolated to try to improve sensitivity. As a result of this thermal isolation the mass flow rate $\phi_m$ to temperature difference $\Delta T$ relation shows much greater dependence on the properties of the fluid. This does not guarantee improved accuracy however as there are other heat flows with the flow meter.

Firstly of all there is a conductive heat flow from the heater through the path defining article, which is typically minimized to increase sensitivity. Additionally, there is free convection within the fluid. This convection modifies the temperature distribution within the fluid flowing along the path (in inclined membranes, this effect is used as for inclination sensing). The heat flow due to convection is particularly dependent on the heater temperature, viscosity and heat conductivity of the fluid. There is also heat conduction through the fluid itself which is dependent upon its heat capacity, heat conductivity, pressure, temperature and humidity. Also Infrared radiation to or from the environment to the path can modify the temperature distribution along the path.

Even if the heater and the temperature sensors are thermally isolated as much as is practicable from unwanted external heat flows, there are still inaccuracies in the measured flow rates as a result of the additional heat flows described above.

Additionally, it is known that variations in the temperature of the pathway can cause deviations from the linearity of the relation between temperature difference and flow rate. This is due to the variations in the heat flows such as free convection, which are typically not linearly proportional to temperature. This leads to inaccuracies in the measured flow rate and particularly to offset drift.

It is therefore an object of the present invention to provide a calorimetric flow meter that alleviates or overcomes the above problems.

According to a first aspect of the present invention, there is provided a calorimetric flow meter comprising a pathway along which a fluid may flow in a particular direction; a heating means for heating the fluid flow; and temperature sensing means provided at points upstream and downstream of the heating means for measuring a temperature difference therebetween wherein one or more strips of material having a relatively high heat conductivity are provided adjacent to said heating means, said strip or strips having axes running in a substantially different direction to the direction of fluid flow.

The provision of the one or more strips of material having relatively high heat conductivity adjacent to the heating means conducts heat away from the heating means and reduces the proportion of the heat generated by the heater available to power unwanted heat flows that cause inaccuracy or offset in the measured flow rate.

Preferably, the fluid flows along a pathway defined by a pathway defining article. The pathway defining article may be a membrane, a tube, a pipe or other suitable structure. The relatively high conductivity strips have a relatively high heat conductivity compared with the pathway.

Preferably the axes of the strip or strips are substantially perpendicular to the direction of fluid flow. Typically two such strips are provided, one on either side of the fluid flow path.

The heating means may comprise a single heater or a plurality of heaters. If the heating means comprises a plurality of heaters, they are preferably dispersed evenly to the side of the flow path. In some preferred embodiments, additional heating means are provided at both the upstream points and the downstream points.

In one preferred embodiment, there is provided a strip or strips of material with a relatively high heat conductivity running substantially parallel to and adjacent to the fluid flow path. This directs heat from the heater along the flow path and thus prevents the heat flowing to unwanted parts of the flow meter.

The temperature sensing means may comprise separate temperature sensors at the upstream temperature measuring point and the downstream temperature measuring point. Alternatively, the temperature sensing means may comprise one or a plurality of thermopiles (or thermocouples) connected along the flow path between the upstream and downstream temperature measuring points. In some embodiments, the thermopile or thermopiles (or thermocouples) may comprise or be incorporated into one or more of the strips of material with a relatively high heat conductivity running adjacent to and substantially parallel to the fluid flow path.

In some embodiments, the strip or the strips of material with a relatively high heat conductivity having axes substantially perpendicular to the direction of fluid flow may incorporate or comprise one or more thermopiles (or thermocouples).

The thermopiles lying parallel to the flow direction may be used to directly read out a temperature difference between the upstream and downstream points. To reduce the non-linearity in the relation between temperature difference and flow, thermopiles perpendicular to the flow direction may be monitored to see that a constant signal is maintained between their ends adjacent to the heater and their other ends which may be provided at a position that maintains a reference temperature or acts as a heat sink. This allows the heating means to be controlled such that it is at a constant temperature and hence non-linearity in the flow rate temperature difference relation is reduced.

According to a second aspect of the present invention, there is provided a calorimetric flow meter comprising a pathway along which a fluid may flow in a particular direction; a heating means for heating the fluid flow; and temperature sensing means provided at points upstream and downstream of the heating means for measuring a temperature difference therebetween wherein one or more strips of material having a relatively high heat conductivity are provided substantially parallel to and adjacent to the direction of fluid flow.

The flow meter of the second aspect of the present invention may incorporate any or all features of the flow meter of the first aspect of the present invention as desired or as appropriate.

The provision of the one or more strips of material having relatively high heat conductivity provided substantially parallel to and adjacent to the direction of fluid flow directs heat from the heater along the flow path and thus reduces the proportion of the heat generated by the heater available to power unwanted heat flows that cause inaccuracy or offset in the measured flow rate.

In one particularly preferred embodiment of either the first or the second aspects of the present invention, the calorimetric flow meter comprises: a pathway along which a fluid may flow in a particular direction; a heating means for heating the fluid flow; and temperature sensing means provided at points upstream and downstream of the heating means for measuring a temperature difference therebetween; one or more strips of a material with a relatively high heat conductivity provided adjacent to said heating means, the axes of said strips running substantially perpendicular to the particular direction of fluid flow; and one or more strips of a material with a relatively high heat conductivity provided adjacent to and substantially parallel to the fluid flow path. The temperature sensing means in such an embodiment may comprise one or a plurality of thermopiles provided between said upstream point and said downstream point. Said thermopile or thermopiles may comprise or may be incorporated into strips of material with relatively high heat conductivity provided adjacent to and substantially parallel to the fluid flow path.

According to a third aspect of the present invention, there is provided a method of determining the mass flow rate of a fluid in a calorimetric flow meter of the type having a pathway along which a fluid may flow in a particular direction; a heating means for heating the fluid flow; and temperature sensing means provided at points upstream and downstream of the heating means for measuring a temperature difference therebetween; and a heater, temperature monitoring thermopile or thermopiles having a relatively high heat conductivity provided adjacent to said heater and having axes substantially perpendicular to the direction of fluid flow and operable to measure a temperature difference between the pathway adjacent to the heater and a reference temperature comprising the steps of: controlling the power input to the heating means in response to the output of the heater monitoring thermopile or thermopiles so as to maintain the output of said heater monitoring thermopile or thermopiles substantially constant; measuring the temperature difference between the upstream and downstream points and thereby calculating the flow rate.

The method of the third aspect of the present invention may incorporate any or all features of the flow meters of the first aspect and/or second aspects of the present invention or be used in conjunction with the flow meters of the first aspect and/or second aspects of the present invention as desired or as appropriate.

Maintaining the temperature of the pathway as close to constant as possible reduces temperature dependencies of the flow rate temperature difference relation much as possible. Accordingly, the measured flow rate is more accurate than with flow meters heated with a constant power.

According to a fourth aspect of the present invention, there is provided a calorimetric flow meter comprising: a pathway along which a fluid may flow in a particular direction; a primary heating means for heating the fluid flow; temperature sensing means provided at points upstream and downstream of the primary heating means; upstream and downstream heating means provided upstream and downstream of the primary heating means; and a control means operable to: monitor the fluid temperature at the upstream and downstream points; adjust the power supplied to each of the upstream and downstream heaters to maintain a substantially equal temperature at the upstream and the downstream points; determine the difference in power supplied to said upstream and downstream heaters; and thereby determine the mass flow rate of the fluid.

According to a fifth aspect of the present invention, there is provided a method of determining the mass flow rate of a fluid in a calorimetric flow meter comprising a pathway along which a fluid may flow in a particular direction; a primary heating means for heating the fluid flow; temperature sensing means provided at points upstream and downstream of the primary heating means; upstream and downstream heating means provided upstream and downstream of the primary heating means; and a control means, the method comprising the steps of monitoring the fluid temperature at the upstream and downstream points; adjusting the power supplied to each of the upstream and downstream heaters to maintain substantially a substantially equal temperature at the upstream and the downstream points; determining the difference in power supplied to said upstream and downstream heaters; and thereby determining the mass flow rate of the fluid.

The flow meter of the fourth aspect of the present invention and the method of the fifth aspect of the present invention may incorporate any or all features of the flow meter of the first and second aspects of the present invention and/or any features of the method of the third aspect of the present invention as desired or as appropriate.

This provides an alternative method of determining the mass flow in a calorimetric flow meter. This type of flow meter also enables a relatively constant temperature to be maintained over as much of the fluid flow as possible improving accuracy and reducing offset drift. In some embodiments, the ratio of the power supplied to the different heaters may be used to estimate the mass flow rate.

The upstream and downstream heating means are preferably activated in alternative pulses when in use. The pulsing may be synchronised with a high speed clock. In such circumstances, each heating means may be activated on its pulse only if heating is required. In such embodiments, the power difference between the heaters can be calculated by counting the relative number of pulses upon which each heating means is activated. The heating pulses of each heating means are pulse width modulated. The pulses may have a preset amplitude. In an alternative embodiment, the amplitude of the pulses may be varied. In such embodiments, the variation in amplitude may be used to determine the power difference between the upstream and down stream heating means.

Preferably, the heating means are collectively controlled to maintain the temperature adjacent to the primary heating means substantially constant. This temperature regulation results in constant heat loss from other means such as temperature dependent conduction even if the mass flow rate varies. This therefore increases the accuracy of the flow meter. In some embodiments the temperature adjacent to the primary heating means may be maintained substantially equal to the temperature adjacent to the upstream and downstream heating means.

Preferably, the primary heating means is used to supply most of the heat and the upstream and downstream heating means are used for compensating the heat conduction of the flowing fluid. Most preferably, either the total power input at the primary heating means or the total power input at the upstream and downstream heating means combined may be kept constant. This prevents temperature oscillations within the flow meter. The power ratio between the primary heating means and the upstream and downstream heating means can be varied to increase the resolution of the flow meter and/or to optimise the linearity of the flow meter. Of course, the total power of all heaters will be increased if the flow rate increases, otherwise a constant temperature above ambient temperature cannot be maintained.

A further temperature sensing means, which may be a thermocouple or a thermopile, may be provided at the point where the fluid flow enters the passageway. This allows the input temperature of the fluid flow to be monitored and the output of the heaters adjusted accordingly, if required.

The position of the upstream and downstream heating means may be each offset towards or away from the primary heating means relative to the upstream and downstream temperature sensing means. By placing the upstream and downstream heaters closer to the middle than the upstream and downstream temperature sensing means, one can adjust the linearity of the sensor and adjust the modulation depth of the sensing function.

In order that the invention will be more clearly understood, some specific embodiments will be described by way of example only and with reference to the attached drawings, in which.

Figure 1:
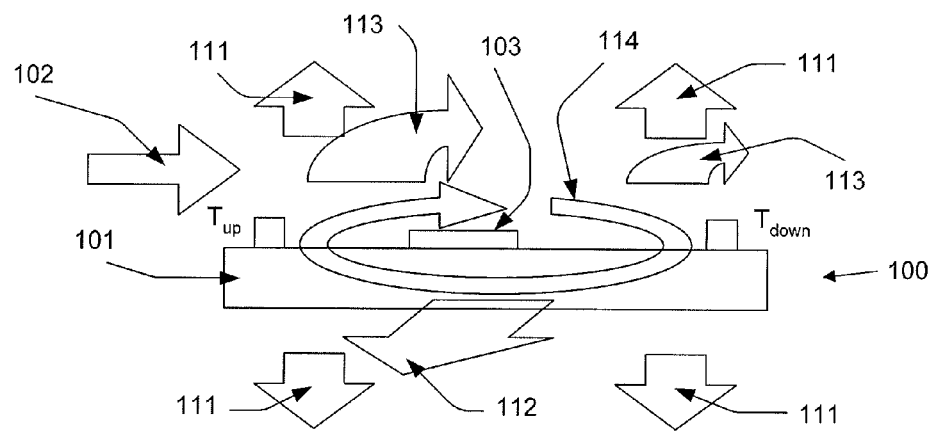
FIG. 1 is a block diagram illustrating heat flows in a calorimetric flow meter.

Referring now to FIG. 1, a known calorimetric flow meter 100 comprises a membrane 101 along which a flow of fluid 102 occurs. At the midpoint of the membrane 101 there is provided a heater 103. The heater 103 causes a non-constant temperature distribution over the membrane 101 as a result of heat conduction through the membrane 101, the temperature being highest in the vicinity of the heater 103 and dropping as the separation from the heater 103 increases. If fluid is flowing along the membrane 101 and is at a lower temperature than the membrane it will absorb heat from the membrane 101 and vary the temperature distribution, lowering the temperature with respect to the expected temperature distribution upstream of the heater 103 and raising the temperature with respect to the expected temperature distribution downstream of the heater 103. The temperature difference between upstream and downstream points $T_{up}$, $T_{down}$ each substantially equidistant from said heater 103 is measured. Due to this temperature difference heat will flow through the membrane opposite to the direction of the fluid flow. This is represented by the flow 114. Typically this measurement is made using absolute temperature sensing means at each point $T_{up}$, $T_{down}$. On a simple model, the temperature difference is proportional to mass flow and can thus be used to calculate the mass flow.

Deviations in the reliability of this model occur because there are other heat flows within the flow meter 100 than the heat flow 113 associated with the fluid flow 102. For instance there is heat 112 conducted, through the membrane 101 in directions other than the direction of fluid flow 102. There is heat 111 conducted, radiated or convected away from the surfaces of the membrane 101 and there is heat 114 transferred by forced convection within the fluid, balanced with a flow through the membrane. This flow 114 makes the sensor work and if it is increased, reduces the additional heat flows 111 and 112. At high operating temperatures also IR radiation is present. These additional heat flows 111 and 112 cause inaccuracies and bias in flow rate measurements made using flow meters of the type 100.

Figure 2:
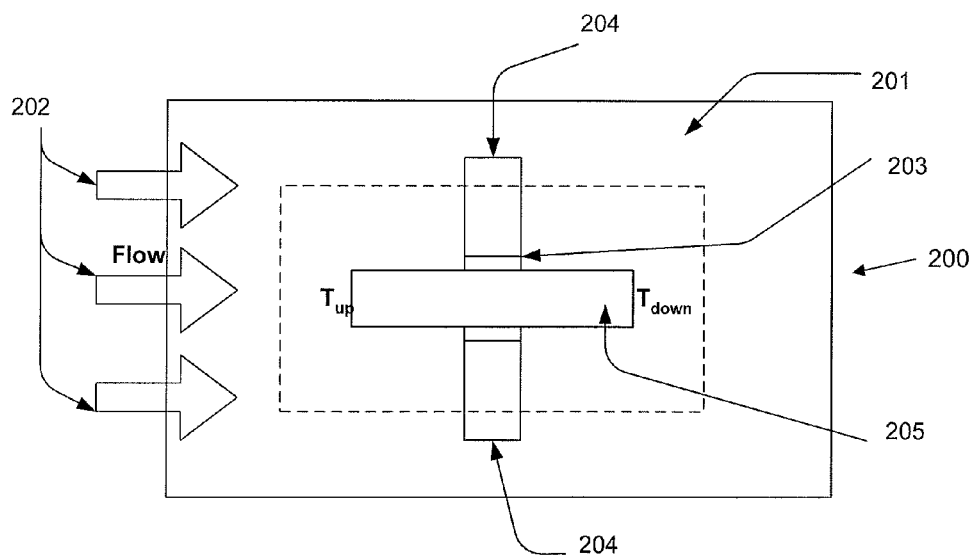
FIG. 2 is a block diagram illustrating a first embodiment of a calorimetric flow meter according to the present invention.

Referring now to FIG. 2, a flow meter 200 according to a first embodiment of the present invention is shown. As in the conventional flow meter, heating means 203 is provided for heating a fluid flow 202 along a membrane 201 and a temperature difference, $\Delta T$, is measured between and upstream point $T_{up}$ and a downstream point $T_{down}$.

In this embodiment 200, there are additionally provided strips of material having a relatively high heat conductivity 204, 205. The strip or as shown in FIG. 2 pair of strips 204, substantially perpendicular to the flow direction 202 direct heat from the heater 203 to the sides of the membrane 201. As these strip(s) 204 have a relatively large heat conductivity, a large proportion of the heat that would otherwise drive heat flows 111, 112 is dispersed and does not therefore cause inaccuracies or bias in the measured flow rate.

In the particular embodiment shown, a strip of material 205 having high heat conductivity relative to the membrane 201 is provided parallel to the flow direction 202. This acts to direct heat flow from the heater along the direction of flow. This increases the proportion of heat that flows along this axis and guides the flow 114 and hence reduces the proportion of heat available to drive heat flows 111 and 112 which cause inaccuracies and bias in the measured flow rates.

Whilst in the embodiment of FIG. 2, both strips 204 and 205 are provide, the provision of strips 204 only or strips 205 only will provide some improvement in performance over the known flow meter of FIG. 1.

In the embodiment of FIG. 2, the temperature difference $\Delta T$ between $T_{up}$ and $T_{down}$ may be measured using a thermocouple (or a thermopile). This advantageously measures a temperature difference between $T_{up}$, and $T_{down}$ directly rather than indirectly. The thermocouple (or thermopile) may be incorporated into the high heat conductivity strip 205. In preferred embodiments, the strip 205 is a thermopile or a plurality of thermopiles. This reduces the complexity of the design.

Typically, the strips 204 may also incorporate a thermocouple or thermopiles such that the temperature of the heater 203 can be monitored relative to a reference temperature or heat sink provided at the edge of the membrane 201.

In embodiments wherein both strips 204 and 205 comprise thermopiles, the flow rate can be measured simply and accurately by reading the signal from thermopile 205. The accuracy of this measurement and in particularly the linearity of the relation between the measured temperature difference and the flow rate can be maximized by maintaining the heater 203 at a substantially constant temperature, this reduces changes in the heat flows 111 and 112. The heater 203 can be maintained at a constant temperature by using the signals from thermopiles 204 to determine the variation in temperature between the heater 203 and the reference provided by the edge of the membrane 201 and adjust the power supplied to the heater to maintain this temperature difference as constant as possible.

Although this allows the temperature in the middle of the membrane 201 to be kept constant, the temperature at $T_{down}$ and $T_{up}$ is still different. This can introduce some bias and inaccuracy but is an improvement over known flow meters such as that shown in FIG. 1.

Figure 3:
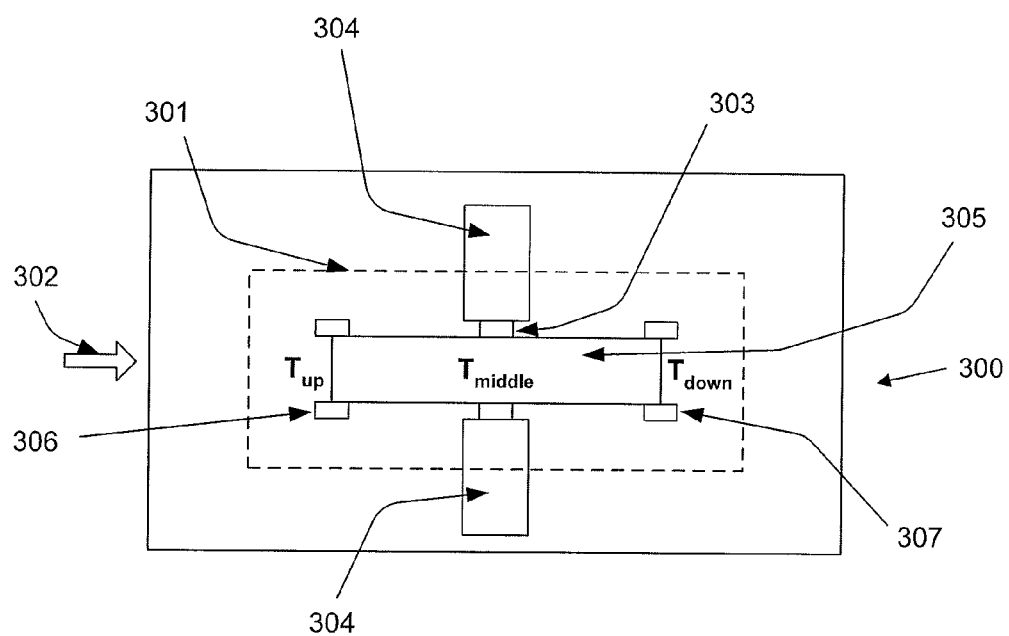
FIG. 3 is a block diagram illustrating a second embodiment of a calorimetric flow meter according to the present invention.

Referring now to FIG. 3 a further alternative embodiment of a flow meter 300 is shown. This embodiment is largely similar to that of FIG. 2 having a membrane 301, a fluid flow 302, and thermopiles 304 and 305, however this embodiment comprises a primary heater 303 and two additional heaters 306, 307. The additional heaters 306, 307 comprise an upstream heater 306 located at $T_{up}$ and a downstream heater 307 located at $T_{down}$. The additional heaters 306 and 307 can be used to reduce the temperature variation across the membrane 301 and hence reduce non-linear variations in the relation between ΔT and flow rate.

A first method of using such a sensor is to use only the additional heaters 306, 307. These heaters 306, 307 are switched on alternatively to deliver a pulse width modulated pulse of heat with a preset amplitude. The power difference in these heating elements replaces the heat flow 114. The switching may be synchronised with a high frequency clock with a much smaller period than the thermal time constant of the membrane arrangement. The output of the thermopile 305 is monitored and a control loop is set up to maintain a substantially constant temperature at $T_{down}$ and $T_{up}$. This is achieved by only switching on each heater 306, 307 at the time for its heat pulse when it is necessary to raise the temperature $T_{down}$ or $T_{up}$ to maintain the constant temperature. By counting the number of clock pulses for which each heater is switched on, an input power difference can be determined (for no flow they will be both on for the same number of pulses). From the input power difference the heat flow due to the mass can be determined and hence the mass flow can be calculated. The amplitude of the pulses may be varied to keep the temperature by heater 303 as stable as possible. Note that using a thermopile for the temperature monitoring has the advantage that such a sensor does not show an offset. Since the output of this thermal sensor is regulated to zero, linearity and drift of the sensitivity do not affect the sensor functioning.

By keeping $T_{down}$ and $T_{up}$ at equal temperature the absolute temperature of the middle and the ends of the flow will still exhibit some non-linear variation with variation in the flow. This change can further be reduced by using the heater 303 to provide most of the conductive heat transferred to the fluid. This allows heaters 306, 307 at $T_{down}$ and $T_{up}$ to be used merely to measure the flow rate.

In this method either the total power input at $T_{down}$ and $T_{up}$ should be kept constant or the power input by heater 303 should be kept constant. If this is not the case, oscillations with the regulation of the middle heater will occur.

Using heater 303 to maintain the conductive heat, the temperature distribution on the membrane 301 is kept as constant as possible along the whole flow pathway. The control loop of this heater also minimises the effect of IR radiation. By varying the power ratio between the heater 303 and heaters 306 and 307, it is possible to set the dynamic range of the flow meter or optimise the flow meter for linearity.

Figure 4:
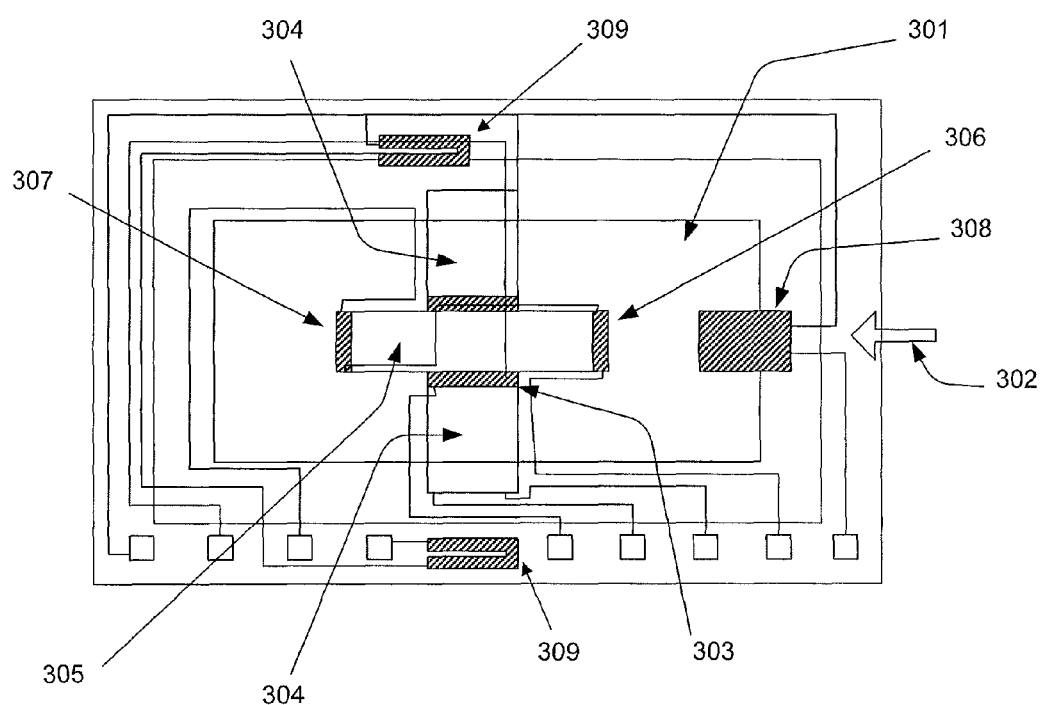
FIG. 4 is a block diagram illustrating a further alternative of the second embodiment of the present invention.

Referring now to FIG. 4, for additional accuracy, it is possible to provide an additional temperature sensing means 308. At the point wherein the fluid flow 302 enters the pathway. The output of this temperature sensing means 308 may be used to measure the input temperature of the fluid 302 and may also be used in setting the power input to the heaters 303, 306 and 307 to accommodate variations in the temperature of the incoming fluid or attempting to maintain as even as possible a temperature along the full length of the pathway. Also provided is temperature sensing means 309 for sensing the ambient temperature. This diagram also shows connections allowing the various components to be controlled by a suitable control means.

It is of course to be understood that the invention is not to be restricted to the details of the above embodiments which are described by way of example only. In particular whilst in the specific embodiments above the pathway defining article is a membrane, it is of course possible that an alternative suitable pathway defining article such as a tube may be used instead.

The invention claimed is:

1. A calorimetric flow meter comprising:
   a pathway along which a fluid flows in a particular direction;
   a first heating means for heating the fluid; and
   temperature sensing means provided at points upstream and downstream of the first heating means for measuring a temperature difference therebetween wherein one or more strips of material having a relatively high heat conductivity are provided substantially parallel to and adjacent to the direction of fluid flow.

2. A calorimetric flow meter as claimed in claim 1, further comprising one or more additional strips of material having a relatively high heat conductivity and positioned adjacent to said first heating means, said one or more additional strips having axes running in a direction substantially perpendicular to the direction of fluid flow.

3. A calorimetric flow meter as claimed in claim 1, wherein the first heating means comprises a single heater or comprises a plurality of heaters dispersed evenly to the side of the flow path.

4. A calorimetric flow meter as claimed in claim 3, wherein additional heating means are provided at both an upstream point and a downstream point in the direction of fluid flow and relative to the first heating means.

5. A calorimetric flow meter as claimed in claim 4, additionally comprising a control means operable to: monitor the temperature of the fluid at the upstream and downstream points; adjust a power supplied to the heating means at the upstream point and to the heating means at the downstream point to maintain a substantially equal temperature at the upstream and the downstream points; determine a difference in power supplied to the heating means at the upstream point and to the heating means at the downstream point; and thereby determine a mass flow rate of the fluid wherein the heating means at the upstream point and the heating means at the downstream point are activated in alternate pulses.

6. A calorimetric flow meter as claimed in claim 5, wherein the temperature sensing means is provided adjacent to the first heating means.

7. A calorimetric flow meter as claimed in claim 5, wherein a further temperature sensing means is provided at a point where the fluid flow enters a passageway for monitoring an input temperature of the fluid flow, and wherein the control means is operable to adjust an output of the first heating means, the heating means at the downstream point, and the heating means at the upstream point in response to the monitored input temperature of the fluid flow.

8. A calorimetric flow meter as claimed in claim 5, wherein a position of the heating means at the downstream point and a position of the heating means at the upstream point are offset towards or away from the first heating means, respectively.

9. A calorimetric flow meter as claimed in claim 1 wherein the temperature sensing means comprise separate temperature sensors at an upstream temperature measuring point and a downstream temperature measuring point and each temperature sensor comprises one or a plurality of thermopiles (or thermocouples) connected along the flow path between the upstream and downstream temperature measuring points.

10. A calorimetric flow meter as claimed in claim 1, wherein one or a plurality of thermopiles (or thermocouples) are provided adjacent to the first heating means, said thermopiles (or thermocouples) lying substantially perpendicular to the direction of fluid flow and operable to determine a temperature difference between the first heating means and a reference temperature or heat sink.

11. A method of determining a mass flow rate of a fluid in a calorimetric flow meter having a pathway along which the fluid flows in a particular direction; a primary heating means for heating the fluid; temperature sensing means provided at points upstream and downstream of the primary heating means for measuring a temperature difference therebetween; and a temperature monitoring thermopile or thermopiles having a relatively high heat conductivity provided adjacent to said primary heating means and having axes substantially perpendicular to the direction of fluid flow and operable to measure a temperature difference between a pathway adjacent to the primary heating means and a reference temperature, the method comprising:
   controlling a power input to the primary heating means in response to an output of the temperature monitoring thermopile or thermopiles so as to maintain the output of said temperature monitoring thermopile or thermopiles substantially constant; and
   measuring a temperature difference between the upstream and downstream points and thereby calculating the mass flow rate.

12. A method as claimed in claim 11, wherein the calorimetric flow meter additionally comprises: upstream and downstream heating means provided upstream and downstream of the primary heating means; and a control means, the method further comprising:
   monitoring the temperature of the fluid at the upstream and downstream points;
   adjusting a power supplied to each of the upstream and downstream heating means to maintain a substantially equal temperature at the upstream and the downstream points; and
   determining a difference in power supplied to said upstream and downstream heating means, thereby determining the mass flow rate of the fluid, wherein the upstream and downstream heating means are activated in alternate pulses.

13. A method as claimed in claim 12, wherein each of the upstream and downstream heating means is activated on its pulse only if heating is required, and wherein a ratio of the power supplied to the upstream and downstream heating means is calculated by counting a relative number of pulses upon which each of the upstream and downstream heating means is activated.

14. A method as claimed in claim 12, wherein the alternate pulses are pulse width modulated and the alternate pulses have a preset amplitude.

15. A method as claimed in claim 12, wherein an amplitude of the alternate pulses is varied and is used to determine the difference in power supplied to the upstream and downstream heating means.

16. A method as claimed in claim 12, wherein a temperature adjacent to the primary heating means is monitored, and wherein the primary heating means and the upstream and downstream heating means are collectively controlled to maintain the temperature adjacent to the primary heating means substantially constant.

17. A method as claimed in claim 16, wherein the temperature adjacent to the primary heating means is maintained substantially equal to temperatures adjacent to the upstream and downstream heating means.

18. A method as claimed in claim 12, wherein the primary heating means is used to supply most of the heat and the upstream and downstream heating means are used for compensating a heat conduction of the flowing fluid.

19. A method as claimed in claim 12, wherein either a total power input at the primary heating means or a total power input at the upstream and downstream heating means combined is kept constant.

20. A method as claimed in claim 12, wherein an input temperature of the fluid flow is monitored and the outputs of the primary heating means and the upstream and downstream heating means are adjusted in response to the monitored input temperature of the fluid flow.

* * * * *